Patented Apr. 20, 1937

2,077,887

UNITED STATES PATENT OFFICE 2,077,887

DYESTUFFS OF THE DIOXAZINE SERIES SOLUBLE IN WATER AND A PROCESS OF PREPARING THEM

Georg Kränzlein, Heinrich Greune, and Franz Brunnträger, Frankfort-on-the-Main-Hochst, Germany, assignors to General Aniline Works, Inc., New York, N. Y., a corporation of Delaware No Drawing. Application October 21, 1931, Serial No. 570,254. In Germany October 29, 1930

7 Claims. (Cl. 260—28)

The present invention relates to new dyestuffs of the dioxazine series soluble in water and a process of preparing them.

We have found that compounds which are probably oxazine-like and are soluble in water are obtainable in an easy manner by treating a 2.5-diarylamino-1.4-benzoquinone of the following general formula:

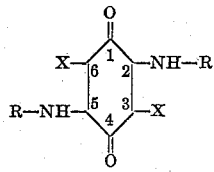

wherein X represents hydrogen, halogen, alkyl, aralkyl or aryl and the two R's represent identical aromatic radicals of the group consisting of benzene, naphthalene, anthracene, diphenyl, diphenylamine and carbazole, with strong sulfuric acid, chlorosulfonic acid, oleum or sulfur trioxide, if desired in an inert solvent, such as carbon tetrachloride, ethylene chloride, liquid sulfur dioxide or the like. In order to increase the yield it is sometimes advantageous to add to the reaction mixture boric acid or a small quantity of an oxidizing agent such as pyrolusite, permanganate, chloranil, dinitrophenol, a ferric salt, arsenic acid or a persulfate or the like. By adding to the mass before, during or after the condensation a halogenating agent or an agent yielding halogen there are obtained valuable, more highly halogenated dyestuff sulfonic acids.

This new and simple method of making a valuable class of dyestuffs which are useful for dyeing animal, vegetable and artificial fibers, especially also mixed fabrics, represents an important industrial advantage.

According to the process of the present invention new products are obtainable, for instance those which have the following probable formula

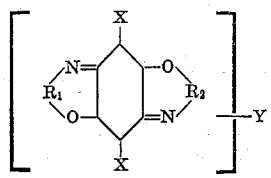

wherein X represents a substituent of the group consisting of hydrogen, halogen, alkyl, aralkyl, and aryl and $R_1$ and $R_2$ stand for an aromatic nucleus of the group consisting of diphenyl and anthracene, bound in two adjacent positions to the oxygen- and nitrogen atoms $R_1$ being identical with $R_2$ and Y means that the products are sulfonated, which dyestuffs are soluble in water and dye the animal, vegetable and artificial fibers.

The following examples serve to illustrate the invention but they are not intended to limit it thereto, the parts being by weight:

(1) 50 parts of 2.5-dianilido-3.6-dichloro-1.4-benzoquinone are introduced at ordinary temperature into 1000 parts of sulfuric acid monohydrate. While heating to 95° C. 5 parts of pyrolusite or 5 parts of potassium permanganate are slowly added and the said temperature is maintained for 4 hours. After cooling the whole is poured on 2000 parts of ice, filtered with suction and the solid matter is washed with a concentrated solution of sodium chloride until neutral, and then dried.

There is obtained with a good yield a dyestuff-sulfonic acid dyeing animal, vegetable and artificial fibers brown tints.

(2) 50 parts of 2.5-di-meta-toluido-3.6-dichloro-1.4-benzoquinone are introduced at ordinary temperature, without cooling, into 1000 parts of sulfuric acid monohydrate, the whole is heated for 4 hours to 95° C., then poured on ice and worked up as in Example 1.

The dyestuff-sulfonic acid, obtained with a good yield, dyes the fiber brown tints.

(3) 50 parts of 2.5-di-β-napthylamino-3.6-dichloro-1.4-benzoquinone are introduced at ordinary temperature into 1000 parts of oleum of 60 per cent. strength. The temperature thereby rises from 20° C. to about 40° C. After heating for 2 hours to 50° C. the mass is poured into 1000 parts of concentrated sulfuric acid, chlorine is introduced for some time and the product is worked up as in Example 1.

The dyestuff-sulfonic acid thus obtained, with a good yield, dyes wool, cotton, silk and viscose reddish violet tints.

(4) 10 parts of 2.5-di-β-naphthylamino-3.6-dichloro-1.4-benzoquinone are allowed to stand for 5 days at ordinary temperature under a glass bell beside 20 parts of sulfur trioxide. The product is decomposed by means of ice and water, the solution is filtered with suction and the solid product is washed with sodium chloride water and dried. There is obtained a dyestuff-sulfonic acid which dyes tints similar to those produced by the products obtainable according to Example 3.

(5) 50 parts of 2.5-di-β-naphthylamino-1.4-benzoquinone are introduced within 1 hour into 1000 parts of sulfuric acid monohydrate. The temperature thereby rises from 18° C. to about 50° C. After heating for 4 hours to 50–60° C. the product is worked up as described in Example 1. There is obtained a dyestuff-sulfonic acid dyeing reddish violet tints.

(6) 50 parts of 2.5-di-(para-aminodiphenylamino)-3.6-dichloro-1.4-benzoquinone are heated with 1000 parts of sulfuric acid monohydrate and 10 parts of pyrolusite for 5 hours to 95° C., the whole is poured on 2000 parts of ice, the solution is filtered with suction and the solid matter is washed with sodium chloride until neutral and dried. The dyestuff-sulfonic acid thus obtained dyes cotton, especially in a bath alkalized with sodium carbonate, intense blue tints. It may also be used for dying wool, artificial silk and mixed fabrics.

(7) 20 parts of 2.5-di-(N-ethyl-carbazolyl-3'-amino)-3.6-dichloro-1.4-benzoquinone are introduced into a mixture of 600 parts of liquid sulfur dioxide and 200 parts of sulfur trioxide while cooling by means of a freezing mixture. The whole is kept for 2 hours at —15° C. and slowly heated to 33° C. while the sulfurous acid is distilled off. After decomposition with ice, the dyestuff-sulfonic acid which has been formed is salted out, filtered with suction and washed until neutral.

The yield is very good. The dyestuff dyes animal, vegetable and artificial fibres as well as mixed fabrics, beautiful deep navy blue tints of good fastness to light.

(8) 50 parts of 2.5-di-(N-methylcarbazolyl-3'-amino)-3.6-dichloro-1.4-benzoquinone (obtainable by condensation of chloranil with 3-amino-N-methyl-carbazole), and 500 parts of oleum of 60 per cent. strength are heated together for 2 hours to 50° C.; the whole is then diluted with 500 parts of sulfuric acid and poured on 1500 parts of ice and filtered; the solid matter is washed first with sodium chloride until neutral and then with dilute hydrochloric acid until it is free from salt, and dried. There is obtained, with a very good yield, a dyestuff-sulfonic acid which is easily soluble in the form of its alkali salt and dyes the fiber intense, blue tints.

(9) 50 parts of 2.5-di-(N-ethylcarbazolyl-3'-amino)-3.6-dichloro-1.4-benzoquinone and 1000 parts of chloro-sulfonic acid are heated together for some hours to about 90° C. and the whole is poured on 2000 parts of ice and filtered with suction; the solid matter is washed with a sodium chloride solution until neutral and dried. The dyestuff-sulfonic acid thus obtained dyes tints similar to those obtained with the product of Example 8.

(10) A mixture of 1000 parts of oleum of 20 per cent. strength 5 parts of boric acid and 50 parts of 2.5-di-(N-ethylcarbazolyl-3'-amino)-1.4-benzoquinone (obtainable by condensation of 1.4-benzoquinone with 3-amino-N-ethylcarbazole) is kept for 3 hours at 20° C.–30° C.; the mixture is poured on ice and filtered with suction; the solid matter is washed with a sodium chloride solution until neutral and dried.

The dyestuff-sulfonic acid, obtained with a good yield, is easily soluble in the form of its alkali salt and dyes animal, vegetable and artificial fibers beautiful blue tints.

(11) 50 parts of 2.5-di-(β-anthramino)-3.6-dichloro-1.4-benzoquinone (obtainable by condensation of chloranil with β-anthramine) are stirred for some hours with 250 parts of concentrated sulfuric acid and 5 parts of boric acid at 30° C.–50° C.; the mixture is poured on to 500 parts of ice and filtered with suction; the solid matter is washed first with sodium chloride until neutral and then with dilute hydrochloric acid until free from salt, and dried. The new sulfonic acid, obtained with a good yield, dissolves in water to a green solution and dyes the fiber beautiful green tints.

(12) 50 parts of 2.5-di-(β-naphthylamino)-3-methyl-1.4-benzoquinone are introduced at ordinary temperature into 1000 parts of sulfuric acid monohydrate. On heating, sulfonation of the intermediate product takes place at about 80° C. and, on further heating to about 170° C., the dyestuff-sulfonic acid is formed. It is poured on to 2000 parts of ice, filtered with suction and the solid matter is washed with a concentrated solution of sodium chloride until neutral and dried.

The new dyestuff-sulfonic acid thus obtained, with a good yield, dyes wool, cotton, silk and viscose in reddish violet tints.

A similar new dyestuff is obtained by treating in an analogous manner 2.5-di-(β-naphthylamino)-3-benzyl-1.4-benzoquinone with sulfuric acid.

(13) 20 parts of 2.5-di-(N-ethyl-carbazolyl-3'-amino)-6-phenyl-1.4-benzoquinone are introduced into 400 parts of sulfuric acid monohydrate and the whole is heated to about 130° C. to about 170° C. for some time. The dyestuff-sulphonic acid which has been formed is poured on 800 parts of ice and filtered with suction; the solid matter is washed with a concentrated solution of sodium chloride until neutral and dried.

The dyestuff-sulfonic acid thus obtained with a good yield, dyes the fiber beautiful blue tints.

(14) 50 parts of 2.5-di-(para-aminodiphenyl)-3.6-dichloro-1.4-benzoquinone are heated together with 1000 parts of sulfuric acid monohydrate for 4 hours to about 150° C. and the whole is poured on 2000 parts of ice and filtered with suction. The solid matter is washed until neutral and dried. The new dyestuff-sulfonic acid thus obtained with a good yield dyes wool, cotton, silk and viscose in red tints which are very fast to light.

(15) 20 parts of 2.5-di-(β-naphthylamino)-6-phenyl-1.4-benzoquinone are introduced into 400 parts of sulphuric acid monohydrate and the whole is heated for some time to about 120° C. to about 180° C. The dyestuff-sulfonic acid which has been formed is poured on ice and filtered with suction; the solid matter is washed with a concentrated sodium chloride solution and dried. The new dyestuff sulfonic acid thus obtained with a good yield dyes the animal, vegetable and artificial fiber beautiful violet tints.

(16) 50 parts of 2.5-di-(para-aminodiphenyl)-3-methyl-1.4-benzoquinone are introduced at ordinary temperature into 1000 parts of sulfuric acid monohydrate and the whole is heated to about 100° C. for 4 hours, poured on 2000 parts of ice, filtered with suction; the solid matter is washed until neutral and dried. The dyestuff-sulfonic acid thus obtained with a good yield, dyes wool, cotton, silk and viscose red tints which are very fast to light.

(17) 50 parts of 2.5-di-(β-anthramino)-3-phenyl-1.4-benzoquinone are heated together with 250 parts of strong sulfuric acid for some hours to about 30° C. to about 50° C., the whole is then poured on 500 parts of ice, filtered with suction; the solid matter is washed with a concentrated sodium chloride solution until neutral and dried. The dyestuff-sulfonic acid thus obtained with a good yield dissolves in water to a green solution and dyes the fiber beautiful green tints.

We claim:

1. The process which comprises condensing a 2.5-diarylamino-1.4-benzoquinone of the general formula:

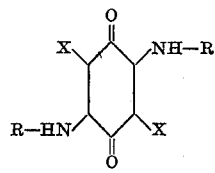

wherein X represents a member of the group consisting of hydrogen, halogen, alkyl, aralkyl of the benzene series and aryl of the benzene series and the two R's represent identical aromatic radicals of the group consisting of diphenyl, diphenylamine and carbazole, with an agent of the group consisting of strong sulfuric acid, fuming sulfuric acid (oleum), chlorosulfonic acid and sulfur trioxide.

2. The process which comprises condensing a 2.5-diarylamino-1.4-benzoquinone of the general formula:

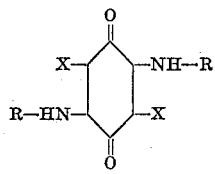

wherein X represents a member of the group consisting of hydrogen, halogen, alkyl, aralkyl of the benzene series and aryl of the benzene series and the two R's represent identical aromatic radicals of the group consisting of diphenyl, diphenylamine and carbazole with an agent of the group consisting of strong sulfuric acid, fuming sulfuric acid (oleum), chlorosulfonic acid and sulfur trioxide and further halogenating the compound thus obtained.

3. The process which comprises heating for 4 hours at a temperature of about 150° C. 2.5-di - (para-aminodiphenyl) -3.6-dichloro-1.4-benzoquinone with sulfuric acid monohydrate.

4. The process which comprises heating for 4 hours at a temperature of about 150° C. 2.5-di - (para-aminodiphenyl) -3.6-dichloro-1.4-benzoquinone with sulfuric acid monohydrate and further halogenating the compound thus obtained.

5. The compounds of the following formula:

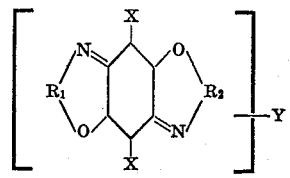

wherein X represents a substituent of the group consisting of hydrogen, halogen, alkyl, aralkyl of the benzene series and aryl of the benzene series and $R_1$ and $R_2$ stand for identical diphenyl radicals bound in two adjacent positions to the oxygen and nitrogen atoms and Y means that the products are sulfonated, being soluble in water and dyeing the animal, vegetable and artificial fiber.

6. The compound of the following formula:

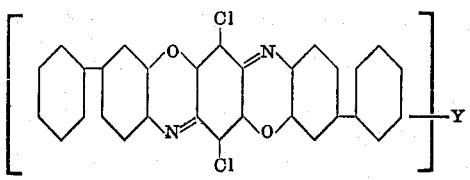

wherein Y means that the product is sulfonated, dyeing wool, cotton, silk and viscose red tints which are very fast to light.

7. The compound of the following formula:

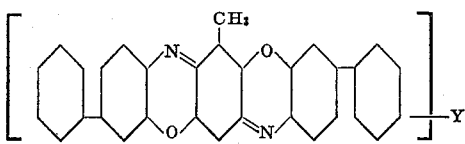

wherein Y means that the product is sulfonated, dyeing wool, cotton, silk and viscose red tints which are very fast to light.

GEORG KRÄNZLEIN.
HEINRICH GREUNE.
FRANZ BRUNNTRÄGER.